United States Patent [19]

Hazard et al.

[11] Patent Number: 4,576,774
[45] Date of Patent: Mar. 18, 1986

[54] FLEXIBLE MASK AND MEANS FOR APPLYING TO HONEYCOMB STRUCTURES

[75] Inventors: Gary M. Hazard, Corning; Arthur E. Hillman, Campbell; Max R. Montierth, Elmira; Albert R. Nieber, Corning, all of N.Y.

[73] Assignee: Corning Glass Works, Corning, N.Y.

[21] Appl. No.: 615,808

[22] Filed: May 31, 1984

[51] Int. Cl.<sup>4</sup> .................. B28B 1/08; B29C 33/42; B32B 3/12
[52] U.S. Cl. ..................... 264/267; 55/DIG. 5; 156/69; 156/73.6; 156/296; 210/321.1; 264/69; 428/117; 428/188
[58] Field of Search .............. 156/69, 73.6, 296, 89; 264/69, 71, 267; 210/321.1; 428/117, 188; 55/DIG. 5

[56] References Cited

U.S. PATENT DOCUMENTS

| 4,403,008 | 9/1983 | Factor | 428/117 |
| 4,411,856 | 10/1983 | Montierth | 264/264 |
| 4,427,728 | 1/1984 | Belmonte et al. | 264/267 |
| 4,428,758 | 1/1984 | Montierth | 55/DIG. 5 |

Primary Examiner—Michael Wityshyn
Attorney, Agent, or Firm—C. S. James, Jr.

[57] ABSTRACT

This invention is directed to means for expediting the fabrication of selectively-manifolded honeycomb structures for use as fluid filter elements. The method comprises the use of flexible masks which are properly aligned to the end faces of a honeycomb structure utilizing vibratory motion in conjunction with a locating wire. By varying the configuration of the masks, it is possible to fabricate a fluid filter element having a center zone which is selectively manifolded and an outer portion wherein at least the ends of the honeycomb structure cells are completely filled.

8 Claims, 9 Drawing Figures

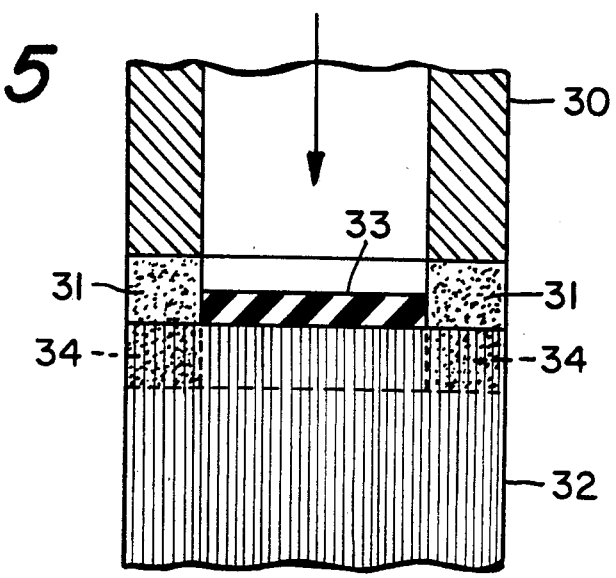
Fig. 5
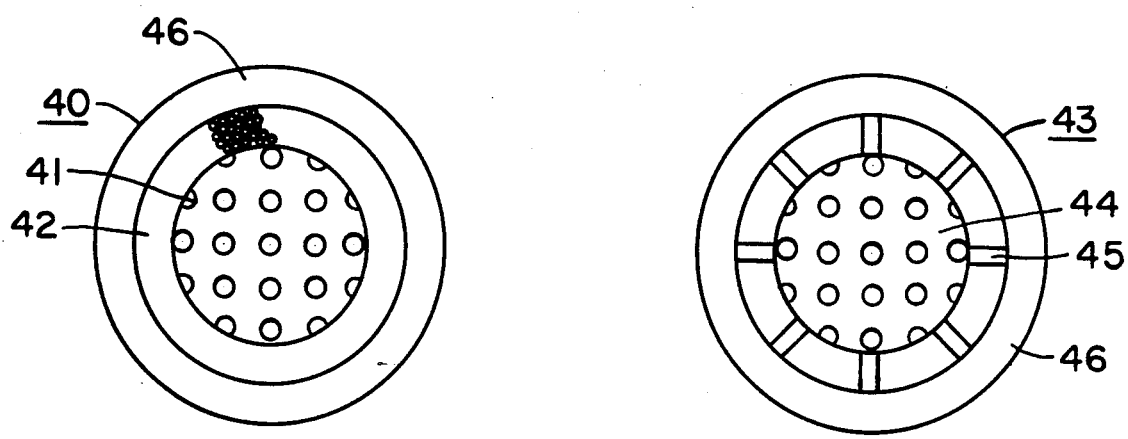
Fig. 6   Fig. 7
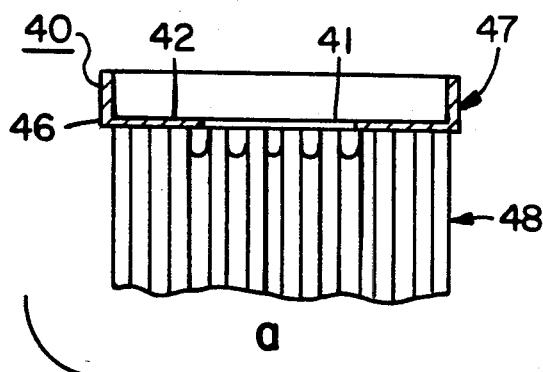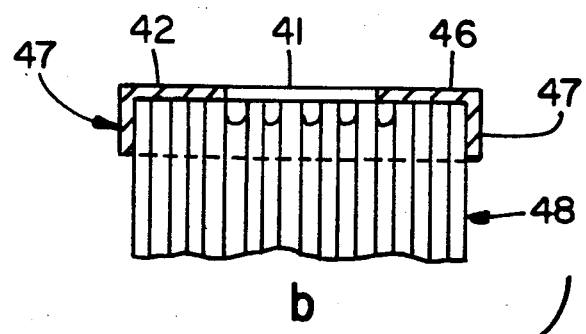
a   b
Fig. 8

FLEXIBLE MASK AND MEANS FOR APPLYING TO HONEYCOMB STRUCTURES

BACKGROUND OF THE INVENTION

The removal of solid particulate materials from fluids, both liquids and gases, is customarily accomplished by means of filters. Most commonly, the filters are fabricated from porous solid articles or masses that have a multitude of apertures or pores extending therethrough, which pores may be interconnected and which have predetermined small cross sections such that the fluids flow through the filters from their inlet surface to their outlet surface, but the size of the pores restrains passage of most or all of the particulates, as desired.

The fabrication of a solid filter body utilizing a honeycomb structure consisting of a matrix of intersecting, thin, porous walls which extend across and between two of its opposing end faces to form a plurality of adjoining hollow passages or cells that likewise extend between and are open at the end faces of the structure is well-recognized in the literature. In constructing the filter, one end of each of the cells is plugged or sealed, a first subset of cells being sealed at one end face and the second subset of cells being sealed at the opposing end face of the structure. The particulate-containing fluid is introduced into the inlet face of the structure via those cells having an open end at the inlet face. Inasmuch as those cells are plugged at the opposite end face of the structure, the fluid is forced through the thin, porous walls into the second subset of cells, i.e., those cells which are sealed at the inlet face of the structure but are open at the outlet face thereof. The solid particulates having diameters too great to pass through the pores or connecting passages of the cell walls are collected on the cell walls and the cleansed fluid emerges through the outlet cells.

As can be appreciated, the crux of the fabrication of filter elements from honeycomb structures resides in the plugging of a selected subset of cells while leaving adjacent cells open. Various methods have been proposed for accomplishing that objective. For example:

U.S. application Ser. No. 165,646, filed July 3, 1980 by Rodney I. Frost and Irwin M. Lachman under the title FILTER AND RELATED APPARATUS, discloses the manufacture of filter units from honeycomb structures wherein the cells have transverse, cross-sectional geometries with no internal angles less than 30°, such as squares, rectangles, equilateral and certain other triangles, circles, ellipses, etc., and are arranged in mutually parallel rows and/or columns. Alternate cells at one end face are filled in a checkerboard pattern and the remaining alternate cells are plugged in the opposite end face of the structure in a reverse pattern.

Frost and Lachman describe preparing such filter units by manifolding, i.e., plugging or sealing, the end of each cell individually with a hand-held, single nozzle, air-actuated gun. As can be appreciated, such hand plugging of individual cells is not practical for the commercial production of filter units where the selective sealing of hundreds of cells may be required. They also conjectured the use of an array of nozzles so that the sealant could be injected simultaneously in a group or all of the alternate cells at each end face of the honeycomb structure. No design or description of such an array was provided, however.

U.S. application Ser. No. 283,733, filed July 15, 1981 by Rodney I. Frost and Robert J. Paisley under the title IMPROVED METHOD AND APPARATUS FOR SELECTIVELY CHARGING HONEYCOMB STRUCTURES, discloses the selective manifolding of honeycomb structures in the fabrication of filter elements through the use of a mask comprising a rigid plate having a number of apertures extending therethrough to register with the open ends of alternate cells.

Masks for manifolding cells which are regularly interspersed among substantially mutually parallel rows and substantially mutually parallel columns at an open surface of a honeycomb structure have been formed by applying strips of an adhesively-backed flexible webbing impermeable to the sealant, such as masking tape, over selected rows or columns of cells. By covering alternate rows and alternate columns of cells with such strips, the open ends of one-half of a subset of cells arranged in a checkerboard pattern across an end face are exposed. After filling the ends of those cells, the strips are removed and strips applied covering the remaining alternate rows and columns, thereby exposing the open ends of the remaining half of the subset of cells of the checkerboard pattern at the end face for filling.

That method embodiment obviously provides greater flexibility in dealing with any surface height variations present in the face of a honeycomb structure and improved masking of the cell ends not to be sealed, including those that may be damaged, then does the use of a mask in the form of a rigid plate. Nevertheless, the method is not commercially attractive since the individual application of the tape strips is a time consuming task.

In another embodiment, a foraminous rigid plate, wherein the holes registered with alternate cells of a honeycomb structure, was fashioned in such manner that a short filling tube was fitted into each hole which protruded from the face of the plate and into a cell when the plate is aligned over the open cell ends of a honeycomb structure. A sealant was introduced from the opposing face of the plate through the holes into the cell ends receiving the tubes. The filling tubes helped to align the metal plate with the cells to be plugged and reduced the possibility of the sealant being fed into the remaining cell ends covered by the plate.

That embodiment, however, was essentially inflexible, an aspect of substantial significance when the number of cells per unit surface area becomes very high such that the thickness of the cell walls is so reduced that distortions in the locations of cell walls become relatively more severe. Moreover, the rigid construction hazarded damage to brittle, thin-walled honeycomb structures.

In yet another embodiment, rigid rivets were attached at regular intervals along lengths of thin flexible strips which ran along alternate diagonals of cells arranged in mutually parallel rows and mutually parallel columns, such rivets being inserted into and covering the open end of cells along the diagonal. By that action one-half of the cells exposed at an end face of the honeycomb structure were covered in a checkerboard pattern and the open ends of all the remaining cells filled in a single sequence of steps. Whereas the strips containing the rivets exhibited greater flexibility than the plate, they required more handling than was desirable for commercial application.

U.S. application Ser. No. 283,732 filed July 15, 1981 by Roy T. Bonzo under the title IMPROVED METHOD AND RELATED APPARATUS FOR SELECTIVELY MANIFOLDING HONEYCOMB STRUCTURES, now U.S. Pat. No. 4,557,773, discloses manifolding the cells of a honeycomb structure by blocking off the open end faces of the structure with a solid covering applied thereto, said covering preferably being a preformed, transparent polymer film through which holes were formed opposite selected cells at each end face with a suitable tool. Again, however, because of cell distortion, the number of openings which can be formed by each application of the tool is limited.

U.S. Pat. No. 4,411,856 discloses a specially-designed, foraminous flexible mask for selectively manifolding cells of a honeycomb structure. The mask contains a multiplicity of holes which permit passage of a sealant into selected cells, and a multitude of protrusions extending from one surface of the mask which are used to align the mask to the end face of the honeycomb structure, and which extend into and sealably cover the cells which are not to receive the sealant. The holes and protrusions are described as being hand fitted into registry with alternate cells.

U.S. application Ser. No. 283,735, filed July 15, 1981 by Roy T. Bonzo under the title METHOD AND APPARATUS FOR ALIGNING BODY WITH HONEYCOMB STRUCTURE, discloses a method for mechanically aligning, rather than hand-fitting, the mask of U.S. Pat. No. 4,411,856 to an end face of a honeycomb structure. The method generally contemplates approximately centering the mask against an end face of a honeycomb structure and then aligning it through rotational vibration such that the holes therein expose a subset of cells and the protrusions engage the remaining cells.

Bonzo described the use of rigid members extending between the mask and an end face of a honeycomb structure to restrict their relative lateral or lateral and angular movement during the vibration of the mask into alignment. For example:

A pin or like member is inserted through an opening at the axial center of the mask and into the central cell of the end face of the honeycomb structure. In so doing, when the mask is vibrated into alignment, it is free to rotate but is constrained from lateral movement. The number is then withdrawn.

In a modification of that embodiment a rod is passed through an opening at the axial center of the mask and through the length of the central cell of the honeycomb structure. A similar mask is placed over the end of the rod and into contact with the other end face of the structure. Vibration of the masks results in rotational movement, but not lateral movement.

In another embodiment two or more rigid members are inserted through openings in the mask into cells of the end face of the honeycomb structure, which not only restrict lateral movement between the mask and the end face of the structure, but also restrain rotational motion during the vibration action.

U.S. Pat. No. 4,427,728 provides yet another method for selectively manifolding cells of a honeycomb structure for the fabrication of filter units. In like manner to U.S. Pat. No. 4,411,856 above, the subject method contemplates the use of a mask containing a multiplicity of protrusions on one face thereof which extend into a subset of cells. In one embodiment, the protrusions are hollow such that, when the sealant is charged against the mask, it will flow through the protrusions and plug that subset of cells. The mask may be aligned in proper registry utilizing the rotational vibration practice described in Ser. No. 283,735 above.

In a second embodiment, a plurality of solid preformed protrusions or plugs are mounted along thin flexible members at predetermined locations, which plugs are inserted into and cover or block the ends of an equal plurality of cells. When the sealant is charged against the end face of the honeycomb structure, it flows into and plugs the alternate, uncovered cells.

Whereas each of the above disclosures describes means for selectively manifolding the cells of a honeycomb structure for the fabrication of filter bodies, commercial production of such units has demanded efforts to be undertaken to devise even more rapid and efficient methods for carrying out that practice. Furthermore, for certain applications a band of completely sealed cells around the periphery at both ends of the unit is required, resulting in a final composite product comprising a center zone of selectively-manifolding cells to perform as a cellular wall filter and an outside band of fully plugged cells.

OBJECTIVES OF THE INVENTION

It is an objective of the present invention to mechanize the fabrication of selectively-manifolded honeycomb structures to thereby render the production of filter units more rapid and efficient.

It is another objective of the invention to devise means for manufacturing a composite product from a honeycomb structure comprising a center or interior zone of selectively-manifolded cells providing cellular wall flow filtering action and an outside or peripheral band of cells completely sealed at both ends of the structure.

BRIEF DESCRIPTION OF THE DRAWINGS

FIG. 5 depicts in cross section a schematic representation of an apparatus for fabricating a composite honeycomb structure having an interior zone of manifolded cells and an outer portion of completely sealed cells.

FIG. 6 comprises a schematic representation in top view of a mask design operable in fabricating composite honeycomb structures.

FIG. 7 consists of a schematic representation in top view of another mask design operable in fabricating composite honeycomb structures.

FIGS. 8a and 8b diagrammatically illustrate the action of a bistable flexible band operable in fabricating composite honeycomb structures.

GENERAL DESCRIPTION OF THE INVENTION

The first objective of the invention is gained through an improvement upon the apparatus disclosed in Ser. No. 283,735 above to more quickly align and seat a flexible mask having protrusions extending outwardly from one face thereof, such as is disclosed in U.S. Pat. No. 4,411,856 or U.S. Pat. No. 4,427,728, in proper registry with the cells in an end of a honeycomb structure.

Figure 1:
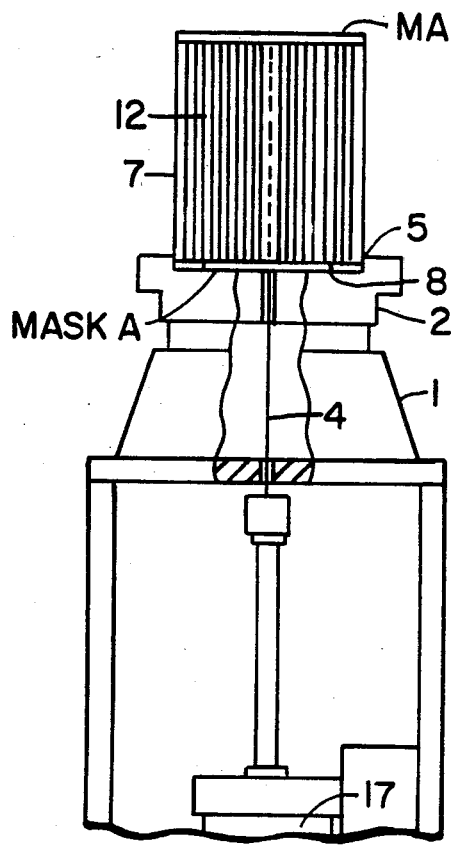
FIG. 1 comprises a schematic representation in side elevation of one embodiment of an apparatus suitable for achieving the objectives of the invention.

FIG. 1 records in side elevation a schematic representation of an apparatus operable for achieving the above object. As depicted therein, vibrator 1 is a device that can impart a rotating-oscillating motion to attached pilot fixture 2. Wire 4 passes through aperture 3 in vibrator 1 and pilot fixture 2. Recessed area 5 in the top of pilot fixture 2 supports and positions flexible Mask A and guides honeycomb structure 7 within its sidewalls. Recessed area 5 is contoured to loosely fit around honeycomb structure 7.

Where round honeycomb structures are involved, recessed area 5 will guide the structure as it rotates over flexible Mask A. In the case a of non-round honeycomb structure, however, recessed area 5 will contain and rotationally vibrate it on flexible Mask A. Aperture 3 and pin 8 attached to and extending upwardly from pilot fixture 2 will position flexible Mask A which, in turn, will assume the oscillation motion.

Figure 2:
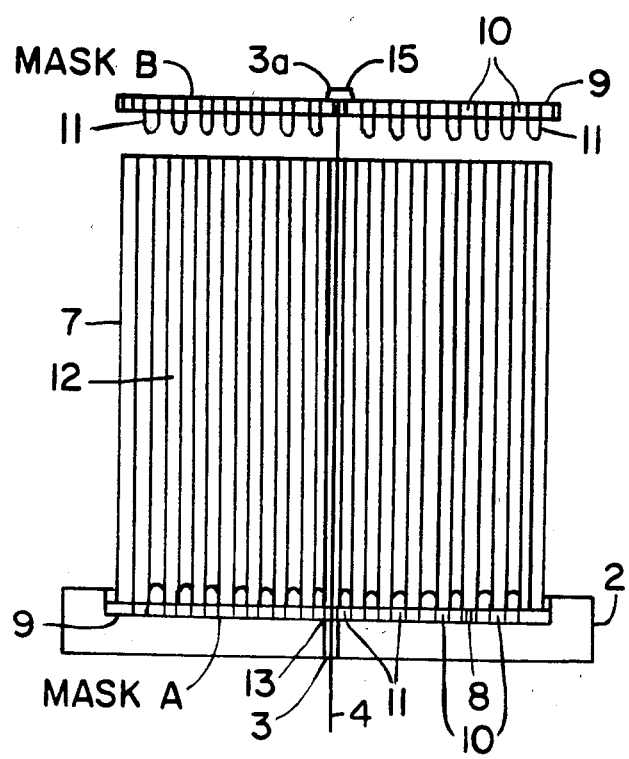
FIG. 2 consists of a schematic representation in side elevation of two designs of masks suitable for use with honeycomb structures.

FIG. 2 depicts in side elevation a schematic representation of two designs of a flexible mask (Masks "A" and "B"), their manner of positioning on the end faces of honeycomb structure 7, and the fit of honeycomb structure 7 into recessed area 5 in pilot fixture 2. Mask A may be formed from any material which is flexible and, desirably, elastic. As is disclosed in U.S. Pat. No. 4,411,856 above, the mask will commonly be fabricated from an organic polymer, desirably an elastomer. That patent reports numerous polymers suitable for preparing masks, those materials being equally applicable in forming masks for use with the present apparatus. Rubbers and silastics are generally preferred. As observed there, the preformed materials exhibit Durometer Shore A values of approximately 70 or less, and the masks have Young's moduli of approximately 10,000 psi or less. Also illustrated are wire 4 passing through aperture 3 and 3A and pin 8 for guiding and positioning Masks "A" and "B". Each mask consists of a matt or body portion 9 containing a multiplicity of openings 10 therethrough and a multitude of protrusions 11 extending outwardly from one surface thereof. The openings 10 and protrusions 11 are positioned with respect to cells 12 of honeycomb structure 7. Hence, each opening 10 is positioned on Mask "A" or "B" to coincide with the open end of a cell 12 to be charged with a plugging material (sealant) through Mask "A" or "B" when either is properly positioned over the end face of honeycomb structure 7. Generally, openings 10 are suitably sized to expose the open end of a selected cell to a sufficient extent for charging the sealant into, but not so large as to expose part or all of any other cell desired not to be plugged. Each protrusion is likewise positioned on Mask "A" or "B" to suitably engage and is preferably sized to seal a single cell at the end face of honeycomb structure 7. Protrusions 11 taper from a diameter at their base which is equal to or larger than a diameter at their tip which is smaller than the minimum cross sectional diameter of the open end of the cells with which they engage. The cone-shaped protrusions illustrated in FIG. 2 are easy to form as are other shapes having a surface or rotation, e.g., cone-topped cylinders, domes, domed cylinders, bullet shapes, etc. The protrusions need not taper along their entire length, although it is desirable that the protrusion tip distal to the matt 9 be tapered to provide some tolerance during registration of the protrusions with the cell ends.

Matt 9 is sized to the nominal contour of honeycomb structure 7. Protrusions 11 are selectively located to fit the symmetric pattern of cells 12 in honeycomb structure 7. A metallic bushing is integrally bonded to and may extend outwardly from the surface of matt 9 opposite to protrusions 11. Mask "A" has a bushing 13 with a clearance hole 14 through the entire length thereof. Open head bushing 13 is positioned to register with an open cell. Mask "B" has a bushing 15 with a blind clearance hole 16. Closed head bushing 15 is positioned to register with a cell of honeycomb structure 7 closed by a protrusion.

Figure 3:
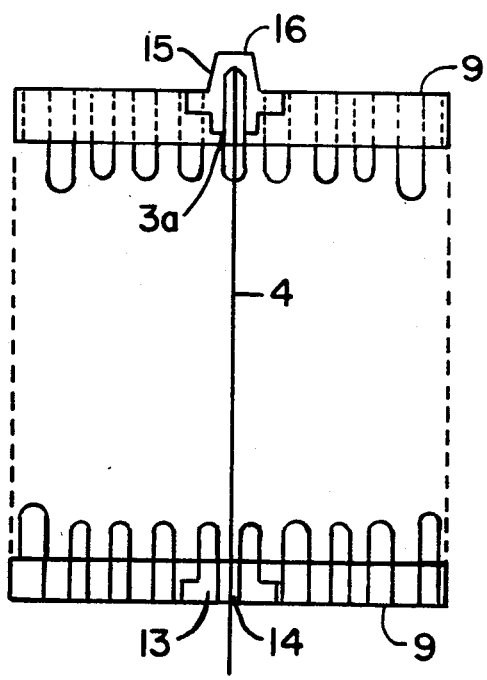
FIG. 3 illustrates in cross section structural features of masks suitable for use with honeycomb structures.

FIG. 3 illustrates the positioning of bushing 13 in Mask "A" and bushing 15 in Mask "B". The actual designs of bushings 13 and 15 are not critical to their operability. It is only necessary that bushing 13 permit wire 4 to pass through the entire length thereof. Bushing 15 will preferably have a solid web portion (blind clearance hole 16) which fits over the end of wire 4.

As represented in FIGS. 1 and 2, wire 4 is connected to an air cylinder 17 which, in turn, drives wire 4 upward through clearance hole 14 in bushing 13 to align Mask "A" and then through aperture 3 and a cell in honeycomb structure 7 and through aperture 3A to align Mask "B". Air cylinder 17 also retracts wire 4 at the conclusion of the manifolding procedure. It will be recognized that other means for raising and lowering wire 4 are known to the art, but an air cylinder comprises the preferred mode because of the close control of movement provided thereby.

The following records a general sequence of operations for the apparatus:

(a) Mask "A" is placed into pilot fixture 2.

(b) Honeycomb structure 7 is placed in pilot fixture 2.

(c) Vibrator 1 is started which causes a round honeycomb structure 7 to vibrate and rotate. (Where honeycomb structure 7 is non-round, it will be vibrated.)

(d) Vibrator 1 is operated for a sufficient length of time to seat honeycomb structure 7 properly into Mask "A".

(e) Honeycomb structure 7 is forced down into Mask "A" for a final seat.

(f) Air cylinder 17 is energized and wire 4 is moved upward through bushing 13 of Mask "A" and honeycomb structure 7 to protrude slightly thereabove.

(g) Mask "B" is placed on top of honeycomb structure 7 in a manner such that bushing 15 fits over the end of wire 4.

(h) Vibrator 1 is started which causes Mask "B", if round, to vibrate and rotate. (Where Mask "B" is non-round, it will be vibrated).

(i) Vibrator 1 is operated for a sufficient length of time to seat Mask "B" properly into honeycomb structure 7.

(j) Mask "B" is forced down into honeycomb structure 7 for a final seat.

(k) Air cylinder 17 is energized to withdraw wire 4 from the masked structure.

(l) The masked structure is removed from pilot fixture 2.

Figure 4:
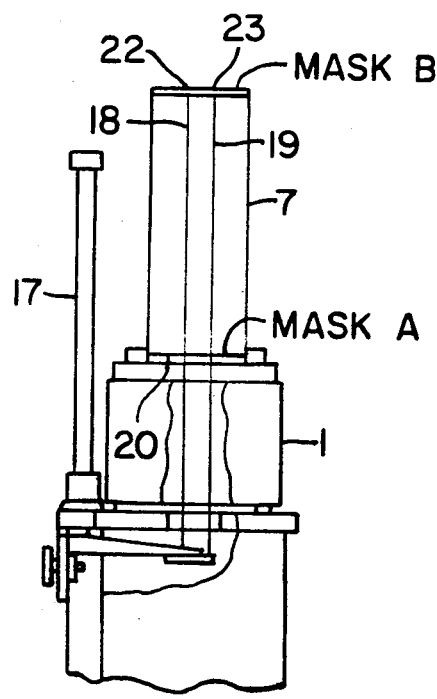
FIG. 4 constitutes a schematic representation in side elevation of another embodiment of an apparatus suitable for achieving the objectives of the invention.

Various modifications in the basic apparatus are well within the skill of the worker in the art. For example, FIG. 4 schematically represents in side elevation an apparatus capable of performing the same function and employing similar components, but wherein two wires (18 and 19) are utilized to locate Mask "B". As can be appreciated, the apparatus described in FIG. 4 requires the use of two bushings for each wire.

Operation of the apparatus of FIG. 4 involves the following general sequence of steps:

(1) Mask "A" is placed into pilot fixture 2.

(2) Honeycomb structure 7 is placed into pilot fixture 2.

(3) Vibrator 1 is started which causes a round honeycomb structure 7 to vibrate and rotate. (Where honeycomb structure 7 is non-round, it will be vibrated).

(4) Vibrator 1 is operated for a sufficient length of time to seat honeycomb structure 7 properly into Mask "A".

(5) Honeycomb structure 7 is forced down into Mask "A" for a final seat.

(6) Air cylinder 17 is energized and wires 18 and 19 are moved upward through open bushings 20 and 21 of Mask "A" and two cells of honeycomb structure 7 to protrude slightly thereabove.

(7) Mask "B" is placed on top of honeycomb structure 7 in a manner such that closed bushings 22 and 23 therein fit over the ends of wires 18 and 19.

(8) Vibrator 1 is started which causes Mask "B" to vibrate.

(9) Vibrator 1 is operated for a sufficient length of time to seat Mask "B" properly into honeycomb structure 7.

(10) Mask "B" is forced down into honeycomb structure 7 for a final seat.

(11) Air cylinder 17 is energized to withdrawn wires 18 and 19 from the masked structure.

(12) The masked structure is removed from pilot fixture 2.

The use of two wires expedites the seating of Mask "B" and, accordingly, constitutes the preferred embodiment of the inventive apparatus.

For certain applications, notably diesel particulate filters for motor vehicles, it is desired that the honeycomb structure have a band of fully plugged cells around the periphery thereof. Hence, the final product consists of a manifolded center zone to perform as a cellular wall filter with an outer ring of cells wherein at least both ends thereof are completely filled, thereby preventing any fluid passing therethrough. Also, that construction significantly enhances the mechanical strength of the unit and permits better sealing of the unit in the surrounding metal cannister. Such configuration requires a modification of the manifolding process described above.

In the simplest embodiment, a flexible mask such as Mask "A" is cut to expose the band or area where complete plugging is desired and then applied to the end face of the honeycomb structure. Upon application of the filling material (sealant), the zone under the mask will be manifolded and at least the ends of the cells outside the mask totally filled. Unfortunately, accurately positioning the mask and retaining the mask in place, coupled with non-uniformity of the fill depth of the sealant, have been chronic problems requiring solutions.

One method for solving that problem contemplates a two-stage operation. The first stage utilizes a solid mask of elastic material cut to cover the zone desired to be manifolded, but to expose the band or area where complete plugging is desired, affixed against the end face of the honeycomb structure and a sealant injected into all of the cells not covered by the mask. That operation is illustrated schematically in FIG. 5 utilizing a press having an annular piston/cylinder 30 which forces a cement sealant 31 into the cell faces of cylindrical honeycomb structure 22 not covered by mask 33 to yield a zone 34 (shown in phantom) of plugged cell faces. Mask 33 determines the configuration and size of the central zone, either circular or otherwise, to be later manifolded. Concentricity is controlled by means of the outside dimension location in the press. In like manner, a band of completely filled cells is produced in the other end face of honeycomb structure 32. (Where a double headed press is employed, a peripheral band or area of completely plugged cell faces can be simultaneously produced in both end faces of structure 32.)

The second stage comprehends manifolding the central zone of structure 32. That operation involves removing solid mask 33 from both end faces of structure 32 and transferring structure 32 to an apparatus such as is depicted in FIGS. 1 and 3. Masks similar to Mask "A" and Mask "B", except each has an area of solid material corresponding to the previously completed plugged zone 34, may be fabricated which are suitably aligned through the vibratory operation of the apparatus. Thereafter, sealant is charged into the open cell ends to manifold the central zone. The presence of the area of solid material in the masks permits the use of a press with a cement cylinder to simply press onto this solid portion of the mask for an end seal.

However, whereas a new mask can be designed having protrusions solely in the area where manifolding is desired, it may be more cost effective to produce masks similar to Masks "A" and "B" and simply cut off the protrusions therefrom in the area of fully plugged cells. Thus, the cells of the honeycomb structure can only be filled in the zone to be manifolded regardless of additional holes in the mask in the area of fully sealed cells.

Another method for fabricating honeycomb structures having a manifolded central area and a band of fully plugged cells around the outside portion or periphery thereof involves utilizing a composite mask in conjunction with a flexible, bistable ring. FIGS. 6 and 7 illustrate two operable mask designs. Whereas FIGS. 6 and 7 reflect circular masks, it will be appreciated that other configurations are also operable.

Composite flexible mask 40 in FIG. 6 consists of a central zone 41 similar in construction to Mask "A" and Mask "B" of FIG. 2, a foraminous outer portion or peripheral band 42 attached to or integral therewith, which, in turn, is attached to or integral with bistable band 46. In FIG. 7, composite flexible mask 43 consists of a central zone 44 similar in construction to Mask "A" and "B" of FIG. 2 and said foraminous outer portion consists of connecting strips 45 attached to or integral therewith and extending outwardly therefrom. Strips 45 are attached to or integral with bistable band 46. Each mask design provides an outer portion of peripheral area permitting essentially full passage of a sealant therethrough.

FIG. 8a depicts in cross section composite flexible mask 40 applied to an end face of honeycomb structure 48 wherein bistable elastic band 46 is shown bent up into an upright position to form flange 47. Element 46 has been termed a bistable band because it maintains its configuration both in an upright position and as flipped down (FIG. 8b) causing flange 47 to press against and hold mask 40 (or 43) in position.

One method for utilizing the composite masks described in FIGS. 6 and 7 contemplates suitably aligning mask 40 or 43 on both faces of honeycomb structure 48 through the vibratory operation of an apparatus such as is illustrated in FIGS. 1 and 2; pilot fixture 2 being suitably designed to accommodate bistable element 46. Masks 43 on opposite ends of structure 48 are rotated slightly with respect to the axis thereof so that the connecting strips 45 are not aligned at both ends, thereby insuring plugging of at least the ends of each cell of structure 48 in this zone in at least one end face. Bistable elastic band 46 is folded down over the edge of structure 48 to form flange 47 which encircles said structure and firmly affixes each mask thereto. A sealant is thereafter charged over mask 40 or 43 which results in manifolding structure 48 under central zone 41 and 44, and completely filling at least the ends of the cells under outer portions 42 or 45.

A modification of the above practice involves suitably aligning a mask over central zone 41 similar in construction to Mask "A" and Mask "B" of FIG. 2. Thereafter, that mask and the entire end face of structure 48 is overlaid with a porous fabric (woven, knit, metal, polymer, etc.) bounded with bistable elastic band 46 which encircles structure 48. The fabric physically holds the mask in proper position and the porosity thereof permits the flow of sealant therethrough.

We claim:

1. A method for fabricating a selectively-manifolded honeycomb structure for use as a fluid filter comprising the steps:
   (a) providing a honeycomb structure having a multiplicity of hollow cells extending therethrough and having a top end face and a bottom end face;
   (b) providing a pair of flexible masks, each mask having a pair of opposing faces, a plurality of openings extending through each mask, an opening in the first mask being surrounded with an open head bushing and an opening in the second mask being surrounded with a closed head bushing, said bushings being located in the same position in each mask, and a plurality of protrusions extending from one opposing face of each mask;
   (c) placing said first mask having said open head bushing in a fixture closely approximating the outside circumference of said first mask with said protrusions extending away from the base of said fixture;
   (d) approximately centering the bottom end face of said honeycomb structure on said first mask;
   (e) vibrating said fixture for a sufficient length of time to seat said bottom end face of said honeycomb structure against said first mask such that a subset of cells of said honeycomb structure is aligned with openings in said first mask, and another subset of cells of said honeycomb structure engages an equal number of protrusions of said first mask;
   (f) forcing said honeycomb structure down over the protrusions of said first mask,
   (g) moving a wire through said open head bushing of said first mask and through the cell of said honeycomb structure directly over said bushing until it protrudes above the top end face of said honeycomb structure;
   (h) approximately centering said second mask on the top end face of said honeycomb structure said closed head bushing fitting over the end of said wire protruding from the top end face and said protrusions of said second mask extending toward the top end face of said honeycomb structure;
   (i) vibrating said fixture for a sufficient length of time to seat said second mask against the top end face of said honeycomb structure such that the openings of said second mask are aligned with a subset of cells of said honeycomb structure, and the protrusions of said second mask engage another subset of cells of said honeycomb structure, said wire locating said second mask on said honeycomb structure;
   (j) forcing said second mask down over the top end face of said honeycomb structure to force the protrusions of said second mask into said subset of cells of said honeycomb structure;
   (k) withdrawing said wire through said honeycomb structure and through said open head bushing;
   (l) extracting said honeycomb structure with said masks in place from said fixture;
   (m) charging a sealant through the openings of said masks into the open ends of said subsets of cells; and
   (n) removing said masks from the top and bottom end faces of said honeycomb structures.

2. A method according to claim 1 wherein said first mask contains two openings being surrounded with open head bushings and said second mask contains two openings being surrounded with closed head bushings, said bushings being located in the same positions in each mask, and wherein a wire passes through each open head bushing and through the cell of said honeycomb structure directly over said bushing to locate said second mask on said honeycomb structure.

3. A method for fabricating a honeycomb structure suitable for use as a fluid filter having a selectively-manifolded center zone and a band of cells around the periphery thereof wherein at least the ends thereof are fully sealed comprising the steps:
   (a) a solid mask of flexible material is affixed to an end face of a honeycomb structure, said mask being cut to cover said center zone, but having exposed a band of cells around the periphery of said honeycomb structure;
   (b) a sealant is injected into at least the ends of the cells outside of said mask;
   (c) a solid mask of flexible material is affixed to the other end face of said honeycomb structure, said mask being cut to cover said center zone, but leaving exposed a band of cells around the periphery of said honeycomb structure;
   (d) a sealant is injected into at least the ends of the cells outside of said mask;
   (e) said masks are removed from both end faces of said honeycomb structure; and then
   (f) said center zone of said honeycomb structure is selectively-manifolded in accordance with the method of claim 1 or 2.

4. A method according to claim 3 wherein said sealant is injected into at least the ends of the cells outside of said solid masks utilizing a press with an annular piston/cylinder.

5. A method according to claim 3 wherein said sealant is injected simultaneously into at least the ends of the cells outside of said solid masks at both end faces of said honeycomb structure utilizing a double headed press with an annular piston/cylinder.

6. A method for fabricating a honeycomb structure suitable for use as a fluid filter having a selectively-manifolded center zone and a band of cells around the periphery thereof wherein at least the ends thereof are fully sealed comprising the steps:
   (a) providing a pair of composite flexible masks consisting of a center zone, a foraminous outer portion or peripheral band attached to or integral therewith, and a bistable element attached to or integral with said outer portion, said center zone having a pair of opposing faces, a plurality of openings extending through each mask, an opening in the first mask being surrounded with an open head bushing and an opening in the second mask being surrounded with a closed head bushing, said bushings being located in the same position in each mask, and a plurality of protrusions extending from one opposing face of each mask;

(b) placing said first mask having said open head bushing in a fixture closely approximating the outside circumference of said first mask with said protrusions extending away from the base of said fixture;

(c) approximately centering the bottom end face of a honeycomb structure on said first mask;

(d) vibrating said fixture for a sufficient length of time to seat said bottom end face of said honeycomb structure against said first mask such that a subset of cells of said honeycomb structure is aligned with openings in said first mask, and another subset of cells of cells honeycomb structure engage an equal number of protrusions of said first mask;

(e) forcing said honeycomb structure down over the protrusions of said first mask;

(f) moving a wire through said open head bushing of said first mask and through the cell of said honeycomb structure directly over said bushing until it protrudes above the top end face of said honeycomb structure;

(g) approximately centering said second mask having said closed head bushing on the top end face of said honeycomb structure with said closed head bushing fitting over the end of said wire protruding from the top end face and said protrusions of said second mask extending toward the top end face of said honeycomb structure;

(h) vibrating said fixture for a sufficient length of time to seat said second mask against the top end face of said honeycomb structure such that the openings of said second mask are aligned with a subset of cells of said honeycomb structure, and the protrusions of said second mask engage another subset of cells of said honeycomb structure, said wire locating said second mask on said honeycomb structure;

(i) forcing said second mask down over the top end face of said hoeycomb structure to force the protrusions of said second mask into said subset of cells of said honeycomb structure;

(j) withdrawing said wire through said honeycomb structure and through said open head bushing;

(k) extracting said honeycomb structure with said masks in place from said fixture;

(l) flexing each of said bistable elements over the edge of said structure to form a flange encircling and pressing tightly against said honeycomb structure to hold said masks in position;

(m) charging a sealant through the openings of said masks into the open ends of the cells of said honeycomb structure to selectively manifold said center zone of said honeycomb structure and to completely fill at least the ends of the band of cells around the periphery of said center zone; and then (n) removing said masks from said honeycomb structure.

7. A method according to claim 6 wherein said first composite mask contains two openings being surrounded with open head bushings and said second mask contains two openings being surrounded with closed head bushings, said bushings being located in the same positions in each mask, and wherein a wire passes through each open head bushing and through the cell of said honeycomb structure directly over said bushing to locate said second mask on said honeycomb structure.

8. A method according to claim 7 wherein said foraminous outer portion consists of connecting strips.

* * * * *